US006879351B1

(12) United States Patent
Brown (10) Patent No.: US 6,879,351 B1
(45) Date of Patent: Apr. 12, 2005

(54) METHOD AND APPARATUS FOR REMOTE CONTROL

(75) Inventor: William J. Brown, Centereach, NY (US)

(73) Assignee: Innotech Systems, Inc., Port Jefferson, NY (US)

( * ) Notice: Subject to any disclaimer, the term of this patent is extended or adjusted under 35 U.S.C. 154(b) by 327 days.

(21) Appl. No.: 09/881,318

(22) Filed: Jun. 13, 2001

(51) Int. Cl.[7] .................................................. H04N 5/44
(52) U.S. Cl. .............. 348/734; 340/825.69; 340/825.72
(58) Field of Search ..................... 348/734; 340/825.69, 340/825.72, 825.25; 345/169, 168; 455/151.4

(56) References Cited

U.S. PATENT DOCUMENTS

| | | | | |
|---|---|---|---|---|
| 5,285,285 A | * | 2/1994 | Yamada et al. ............. | 348/570 |
| 6,160,491 A | * | 12/2000 | Kitao et al. ............ | 340/825.69 |
| 6,278,499 B1 | * | 8/2001 | Darbee et al. .............. | 348/734 |
| 6,407,779 B1 | * | 6/2002 | Herz .......................... | 348/734 |
| 6,496,983 B1 | * | 12/2002 | Schindler et al. ........... | 725/153 |
| 6,567,032 B1 | * | 5/2003 | Mullaly et al. ............. | 341/176 |
| 6,597,374 B1 | * | 7/2003 | Baker et al. ................ | 345/717 |
| 2002/0080044 A1 | * | 6/2002 | Kang et al. ............ | 340/825.69 |
| 2002/0085128 A1 | * | 7/2002 | Stefanik ..................... | 348/734 |
| 2002/0163440 A1 | * | 11/2002 | Tsui ....................... | 340/825.69 |

* cited by examiner

*Primary Examiner*—Michael H. Lee
*Assistant Examiner*—Paulos M. Natnael
(74) *Attorney, Agent, or Firm*—Raymond J. Werner

(57) ABSTRACT

Methods and apparatus to facilitate communication between a user and one or more devices which are remote from the user, reduce the number of required button presses and further reduce keystroke errors, by including the functionality to associate a user selected default device with a particular set of buttons. A universal remote control unit suitable for use with various audio/visual entertainment devices may embody various aspects of the present invention.

22 Claims, 11 Drawing Sheets

METHOD AND APPARATUS FOR REMOTE CONTROL

BACKGROUND OF THE INVENTION

1. Field of the Invention

The present invention relates generally to the field of interfaces between humans and machines, and more particularly to methods and apparatus for facilitating communication between a user and one or more devices which are remote from the user.

2. Background

Over the past several decades there has been a widespread adoption by consumers of various types and pieces of electronic entertainment equipment. Devices such as televisions (TV), set-top boxes, radio receivers, video cassette recorders (VCR), compact disk (CD) players, digital versatile disk (DVD) players, and similar consumer electronic devices have become common in many households.

Many of these modem consumer electronic devices are designed to be operable by remote control. In the earliest versions of remotely controlled consumer electronic devices, a wired connection between the device, a TV for example, and a hand-held control unit was provided. Although the hand-held control unit was remote from the device under control, in this case a TV, it was nonetheless cumbersome and undesirable to have a wire between the two. In view of this disadvantage, hand-held control units were subsequently developed which possessed a wireless link to the consumer electronic device which they controlled. Although any suitable wireless communication link may be used between a device and its corresponding remote control unit, such links are most commonly implemented today by way of an infra-red transmitter and receiver.

Over time consumers tended to acquire a greater number of entertainment devices, each individually operable by remote control. These collections of entertainment devices were often aggregated in a single area of a room, and such an aggregation may be, but is not required to be, referred to as an entertainment center. A disadvantage of such an arrangement is that the user was then required to handle several different remote control devices in order to operate the various components in the entertainment center. For example, in an entertainment center which comprised an aggregation of a TV, set-top box, and CD player, there was also a remote control for the TV, a remote control for the set-top box, and a remote control for a compact disk player, and each of these separate remote controls would need to be used to operate the entertainment center.

In order to overcome the undesirable situation of having many remote control units to properly control an aggregation of individually controllable electronic devices, a more advanced form of hand-held remote control unit was developed. These more advanced remote control units were each capable of operating more than one electronic device. Such remote control units are typically referred to as universal remote controls.

Universal remote controls may be programmed to transmit the control codes recognized by two or more pieces of electronic equipment. However, since many functions, such as for example, "Power-On" or Power-Off, are shared by each of the several devices to be controlled, the universal remote control units are typically provided with buttons that are used to select which one of the two or more of control codes (each recognized by a particular piece of equipment) is to be transmitted by the universal remote control.

What is needed is a universal remote control unit that provides an easy to operate interface with the user.

SUMMARY OF THE INVENTION

Briefly, methods and apparatus in accordance with the present invention facilitate communication between a user and one or more devices which are remote from the user, reduce the number of required button presses, or keystrokes, and further reduce keystroke errors, by including the ability to associate a user selected default device with a particular set of buttons or keys.

In one aspect of the present invention, a remote control unit having a user interface that includes buttons, or keys, determines which one of several function classes a particular button or key is associated with, and based, at least in part, on the determination of the function class, the remote control unit selects a control code for transmission to a device from which it is physically spaced apart.

In a further aspect of the present invention, a method of transmitting information from a first device to a second device, includes, receiving a user input at the first device, determining a class to which the user input belongs, identifying one of a plurality of sets of information which is associated with the class, looking up at least one datum in the identified set of information, and transmitting the datum.

In a still further aspect of the present invention, a remote control unit, includes a user input signal source, a classifier coupled to the user input signal source, an address generator coupled to receive input from the user input signal source and the classifier, a control code memory coupled to receive input from the address generator, and a transmitter coupled to receive input from the control code memory.

BRIEF DESCRIPTION OF THE DRAWINGS

FIGS. 6AA, 6AB, 6B and 6C are flowcharts of a process for setting up and utilizing, the programmed association feature in a specific embodiment of the present invention.

DETAILED DESCRIPTION

Most universal remote control units are concurrently capable of operating, that is supplying control information to, more that one type of audio and/or video (A/V) device. Because of the capability to operate, or control, many different devices, it is necessary from a practicality standpoint, that many of the buttons, or keys, of the conventional universal remote control unit be shared for controlling different devices. For example, a "Power-On" command, might be intended for a set-top box, or a TV, or a DVD player, or a radio receiver. It has been demonstrated that a problem with conventional universal remote controls is that because many buttons must be shared by more than one device it is sometimes difficult for a user to achieve the desired result. For example, if a conventional universal remote control can operate a device such as a TV and a VCR, both devices will share the POWER button, the number buttons (0-9), and the Channel Up and Channel Down buttons. The user must select the device to be operated by pressing a specific selection button prior to pressing one of the above mentioned control buttons. If the user fails to press the correct selection button, the control function code for the wrong device will be transmitted. In addition to failing to press a required button, the user may press an incorrect button, or key.

Accordingly, there is a need for a universal remote control unit in which fewer keystroke errors are encountered and in which fewer button presses are required. Embodiments of the present invention provide methods and apparatus for overcoming such deficiencies of conventional universal remote control units.

Reference herein to "one embodiment", "an embodiment", or similar formulations, means that a particular feature, structure, or characteristic described in connection with the embodiment, is included in at least one embodiment of the present invention. Thus, the appearances of such phrases or formulations herein are not necessarily all referring to the same embodiment. Furthermore, various particular features, structures, or characteristics may be combined in any suitable manner in one or more embodiments.

The terms, set-top box and cable-box are sometimes used interchangeably in this field. Both may be referred to as being "analog" or "digital" depending upon their particular internal circuit configurations. Both typically serve as an interface between a broadband signal source, such as but not limited to a broadband cable, and one or more consumer electronic devices such as, but not limited to, TVs and VCRs. Both typically further include an interface between themselves and one or more remote control units. Such remote control units allow a user to provide control information to the boxes. Such control information may include, but is not limited to commands such as power-on, power-off, channel-up, channel-down, volume-up, volume-down, mute, and so on.

Figure 1:
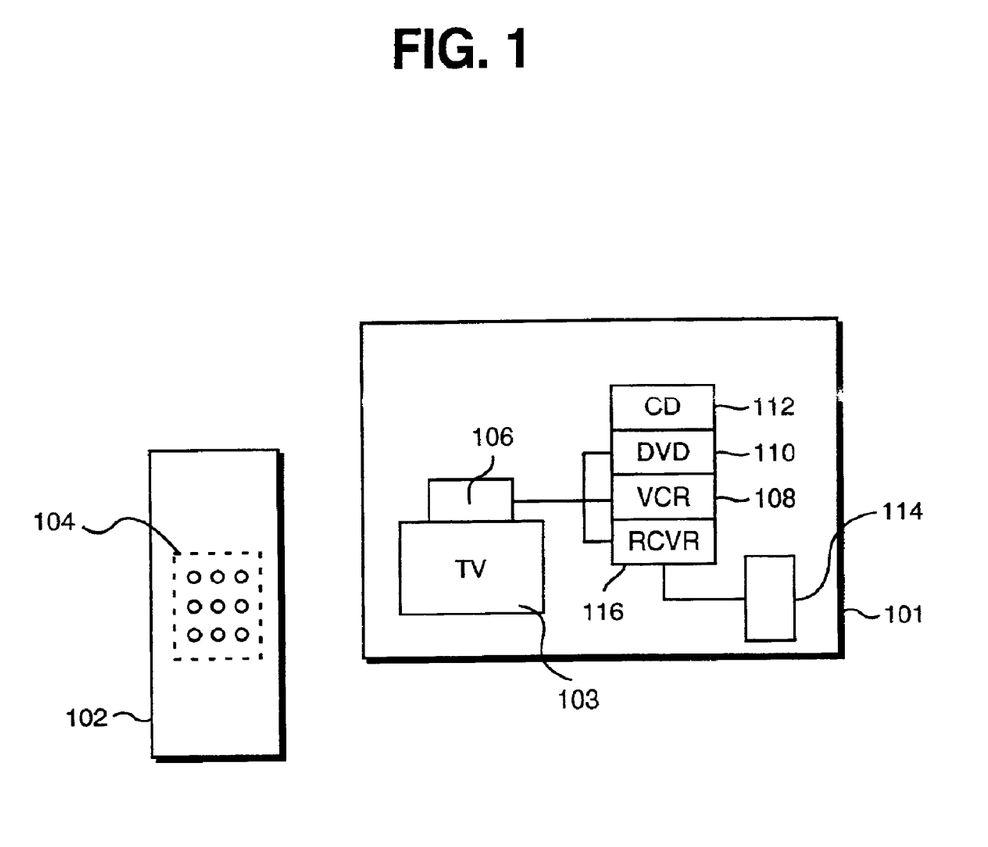
FIG. 1 is a schematic block diagram of a remote control unit and several consumer electronic devices arranged as an entertainment center.

Referring now to FIG. 1, a schematic block diagram is shown which illustrates an entertainment center 101 and a remote control unit 102. Remote control unit 102 wirelessly communicates with entertainment center 101 in this example, and such wireless communication is typical of most implementations of the present invention. Entertainment center 101 includes, but is not limited to, audio/visual equipment such as television 104, set-top box 106, VCR 108, DVD player 110, CD player 112, radio receiver 116, and audio speakers 114.

In one embodiment of the present invention, a capability is included in a remote control unit which provides a method of programming that remote control unit to select a particular source when a specific class of button is pressed. Prior to using this method of programming, the user supplies information to the remote control unit regarding the manner in which that user's A/V system is to be controlled. In this context the term 'source' is often used to refer to one consumer electronic device out of the aggregation of consumer electronic devices in an entertainment center. The term 'source' is used because the selected device becomes the source of entertainment content. However, the source device may also be referred to as the target device from the perspective of it being the desired recipient of the control information being transmitted by the remote control unit. In view of the fact that this disclosure deals with inventive remote control methods and apparatus, the term 'target' will be used because it more clearly sets out the relationship being described.

In this exemplary embodiment, five classes of buttons are defined. A first class which includes buttons that control power, a second class which includes buttons that control volume, a third class which includes buttons that control channel selection, a fourth class of buttons that control transport, and a fifth class of buttons that control other miscellaneous functions for which the remote control unit can supply control codes. Some illustrative examples, but not an exhaustive list, of the five classes are provided here. Examples of the Power Control class include TV power, VCR power, Cable power, Satellite power, and Audio power. Examples of the Volume class include Volume up, Volume down, and Mute. Examples of the Channel class include Channel up, Channel down, the digits 0-9, Enter, and TV/Video. Examples of the Transport class include Play, Stop, Fast Forward, Rewind, Pause, and Record. Examples of the Miscellaneous class include Audio source select, theater effects, and tone control. The present invention is not limited to the five classes described here (i.e., Power, Volume, Channel, Transport, and Miscellaneous), but rather may be supplemented with additional classes as desired.

Figure 2:
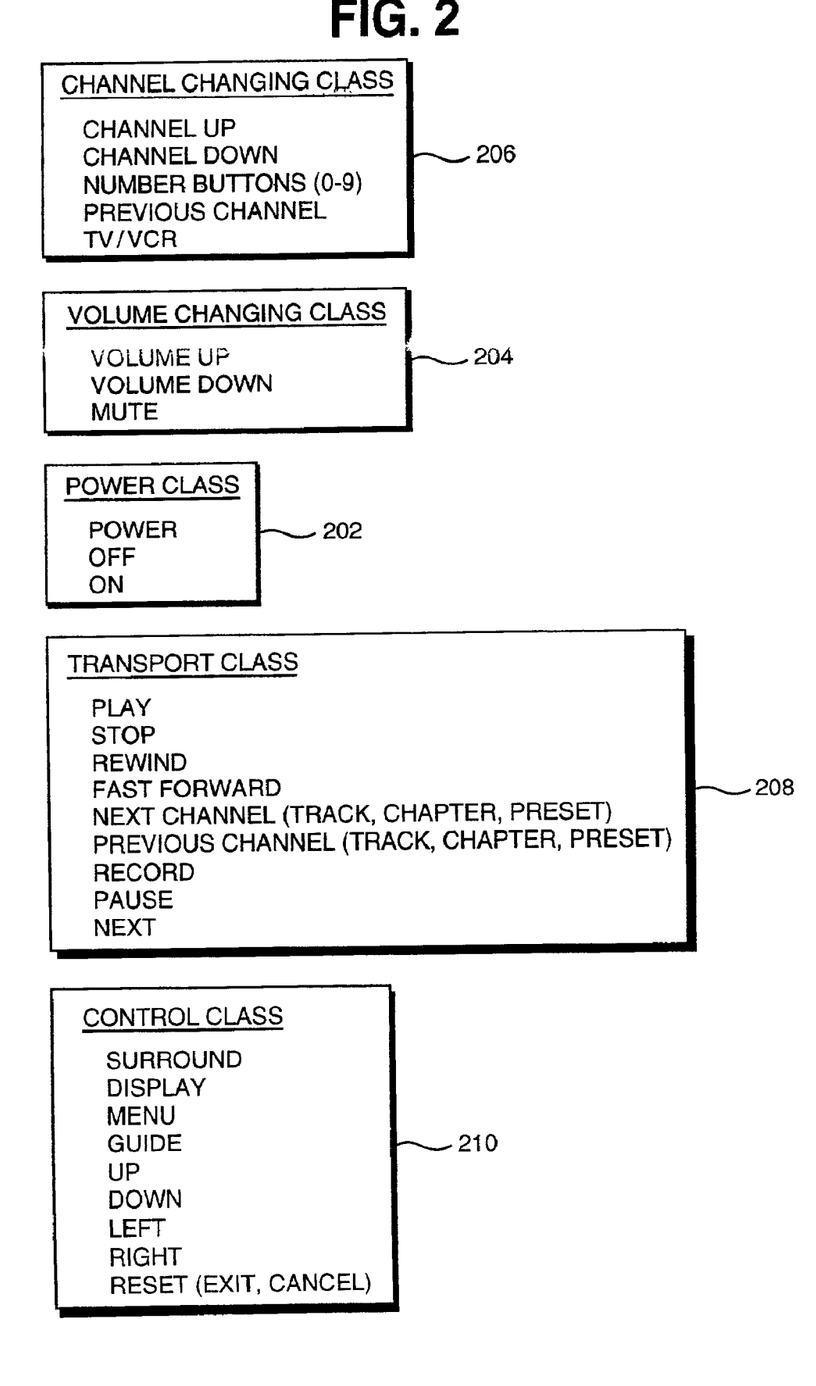
FIG. 2 shows an illustrative grouping of enumerated function buttons into function classes.

FIG. 2 shows an illustrative grouping of enumerated function buttons into function classes. More particularly, grouping 202 shows the Power Class functions: Power, On, and Off. Grouping 204 shows the Volume Control Class functions: Volume Up, Volume Down, and Mute. Grouping 206 shows the Channel Control Class functions: Channel Up, Channel Down, Number buttons (0–9), Previous Channel, and TV/VCR. Grouping 208 shows the Transport Class functions: Play, Stop, Rewind, Fast Forward, Next Channel (track, chapter, preset), Previous Channel (track, chapter, preset), Record, Pause, and Next. Grouping 210 shows the Control Class functions: Surround, Display, Menu, Guide, Up, Down, Left, Right, and Reset (exit, cancel). It should be noted that various other functions may be added to the appropriate Classes above, and that the Classes shown in FIG. 2 are for illustrative purposes.

In a further aspect of this embodiment, the remote control unit is programmed for each of the classes once. These programmed settings are retained in a non-volatile memory, such as flash memory, within the remote control unit. Those skilled in the art and having the benefit of this disclosure will recognize that any suitable non-volatile memory may be used, as may be battery-backed volatile memory. Programming is accomplished in this embodiment as described hereafter. First, a target button, which is located on the remote control unit, (e.g., TV, VCR, CBL, SAT, etc.) is pressed. Next, a programming button is pressed. A programming button is one which, when depressed, generates, or causes the generation of, the signal or signals needed to have the remote control unit establish a default target for a particular functional class of buttons. Whether such a button is referred to as a 'programming button' or some other name is immaterial. Furthermore, the present invention contemplates a user activating a plurality of buttons either concurrently or sequentially to obtain the same functionality as a single programming button. Pressing the programming button distinguishes such programming activity from normal operation of the remote control unit.

The next operation in this process is to press a button within the class that is to be associated with the target selected in the first step. In this illustrative embodiment of the present invention, an indicator, such as but not limited to a light emitting diode (LED), on the remote control unit shows that a priority has been successfully programmed. For example, to associate the channel selection function with a cable-box, the CABLE button is pressed, followed by pressing the PROGRAM button, followed by pressing the CHANNEL UP button. In this illustrative embodiment, the aforementioned sequence of operations may associate all channel selection buttons (e.g., channel up, channel down, 0–9) with the cable box. Although other implementations are possible, for the convenience of the user, a presently preferred embodiment, as described here, allows all buttons associated with the channel selection function to be assigned, or associated, at once by a single programming operation.

Still referring to the same illustrative embodiment, it should be noted a that programming the remote control unit to associate a function class of buttons with a particular target (i.e., a particular device in an aggregation of iconsumer electronic devices which is to receive control information from the remote control unit) will, in a presently preferred embodiment, also puts the control logic of the remote control unit into a state, or mode, in which it is assumed that the programmed association between the function class and target device is to be used. In this embodiment, pressing any target button deactivates the programmed association. It should be remembered that although the "target" device is the target of commands from the remote control unit, it is the source of entertainment content (i.e., audio/visual content). It should also be noted that any suitable alternative for deactivating the programmed association may be used, including but not limited to, voice commands spoken by the user, and one or more buttons dedicated to at least the function of deactivating the programmed association. Where more than one button is dedicated to at least the function of deactivating the programmed association, various implementations may require sequential or concurrent pressing of those buttons.

In some embodiments, a method exists for reactivating the use of the programmed associations by receiving input from, for example, a button. It should be noted that any suitable alternative for reactivating the programmed association may be used, including, but not limited to, voice commands spoken by the user. One or more enunciator lights may optionally be used to indicate to the user that the programmed association function is active.

In the situation where: 1) a remote control unit in accordance with the present invention is used; 2) the aggregation of consumer electronic devices controlled by the remote control unit includes at least two devices which are capable of the channel change function; and 3) when it is required that the channel change function be executed by a device which is not the one subject to the active programmed association; then it is necessary to be able to bypass, or temporarily deactivate, the active programmed association. Such a situation may occur when a cable-box has been selected to have the active programmed association with the buttons of the channel change function class and the user desires to have the TV select channels as in the case of recording a program on one channel while watching another channel.

Figure 3:
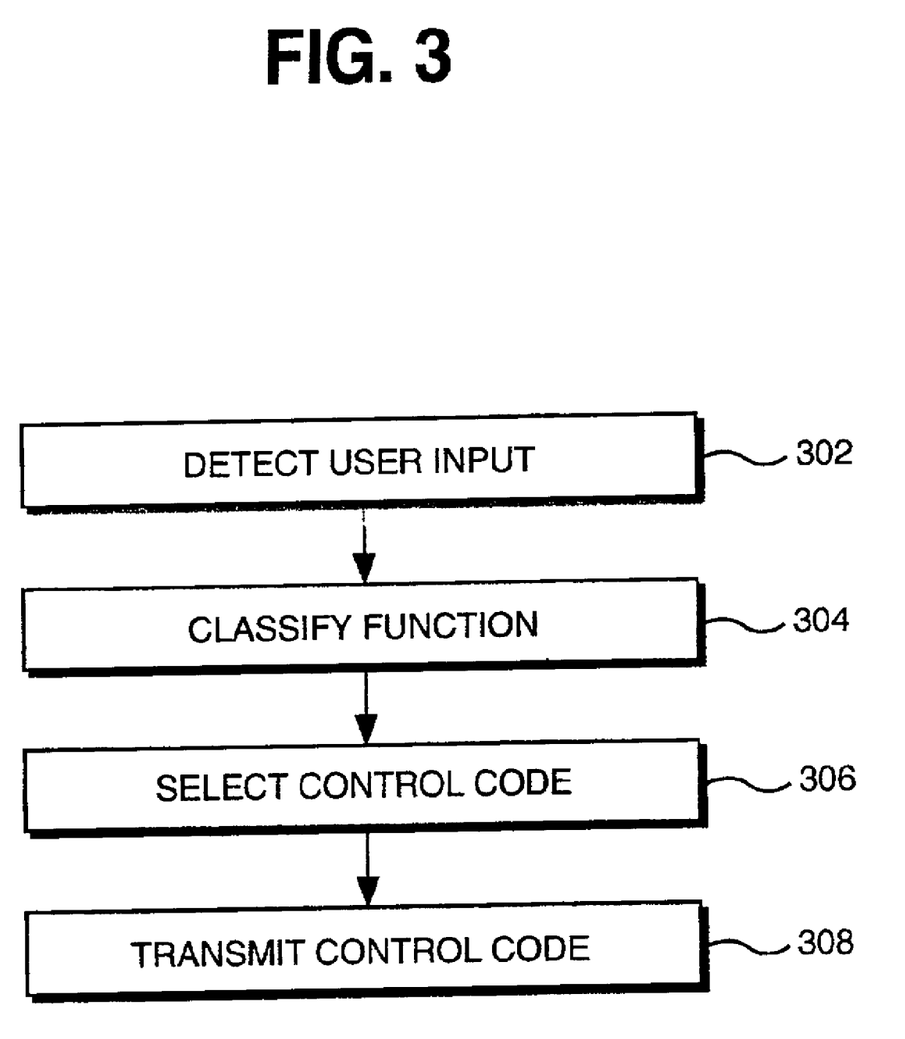
FIG. 3 is a flowchart showing the operations in a process in accordance with the present invention.
Figure 4:
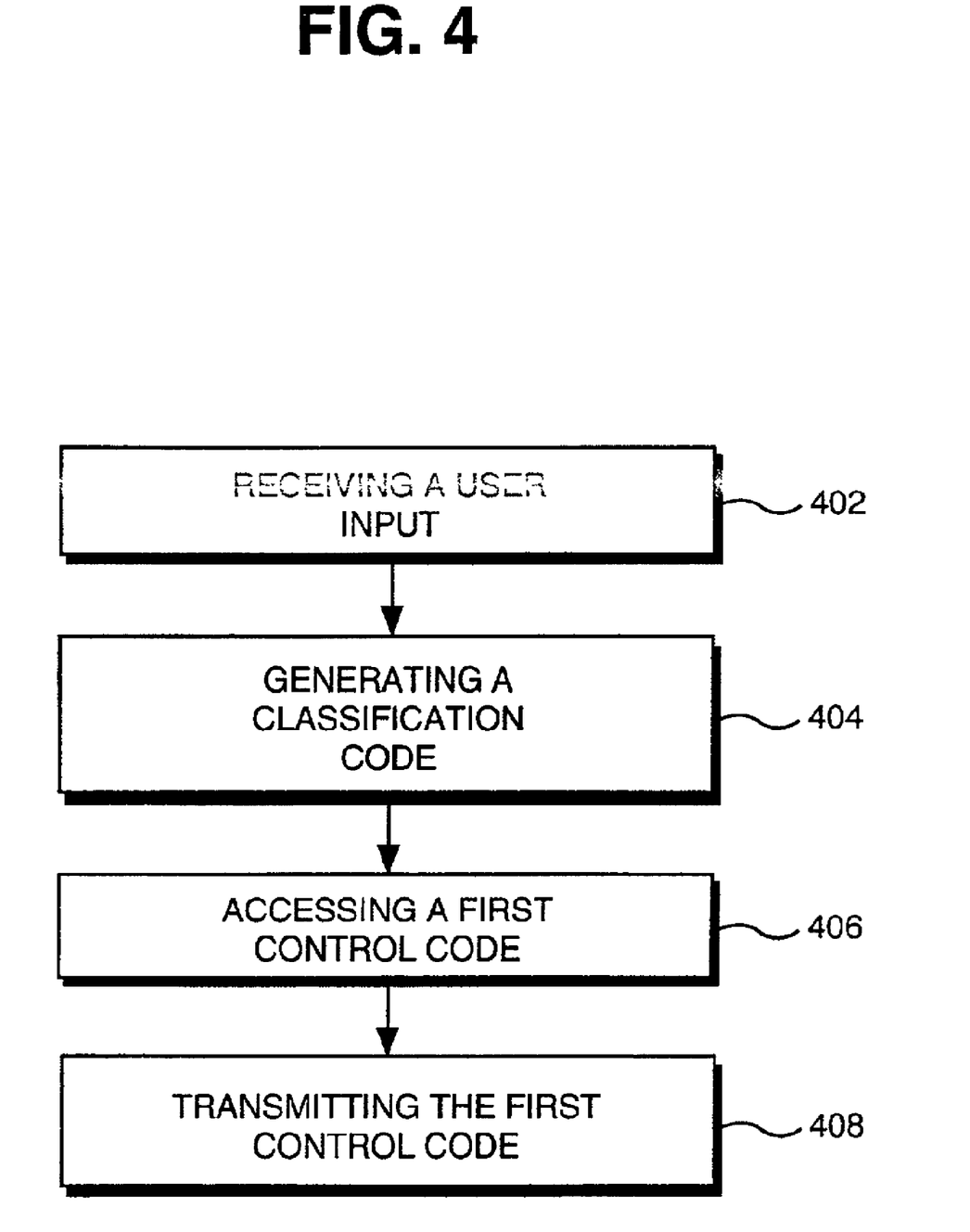
FIG. 4 is a flowchart showing the operations in a process in accordance with the present invention.

FIGS. 3 and 4 are flow diagrams illustrating methods of operating a universal remote control unit in accordance with the present invention. Referring now to FIG. 3, a user input is detected 302. User inputs are typically detected as button pushes. The function represented by the user input is then classified 304. Classification of a function represented by the user input typically involves recognizing which button on the remote control unit has been pressed and further recognizing whether that button relates to turning power on or off for a particular device, changing a channel, changing the volume of some audio output, controlling a transport operation such as, but not limited to, play or rewind, or relates to some other control function. Subsequently, a control code is selected for transmission 306. Selection of the control code is based, at least in part, on the particular button that is pressed and on the programmed association between the function class to which the button belongs, and a particular source of entertainment content. For example, if a TV has been selected as the default device to be associated with the Power Class buttons via the programmed association feature of the present invention, and the On button is pressed, then the "Power On" code for the TV, as opposed to the set-top box or any other device, is selected for transmission by the remote control unit. Once the appropriate code is selected, it is transmitted 308. Such transmission is typically achieved through the use of an infrared (IR) transmitter, and such IR transmission technology is well-known in this field.

Referring to FIG. 4, an alternative method of operating a universal remote control unit in accordance with the present invention is illustrated. The universal remote control unit receives a user input 402. This user input may be provided by voice command or by any other suitable means of communicating with the universal remote control unit. For example, buttons may be pressed, a touchscreen may be accessed, and so on. Based, at least in part, on the user input that is received, the universal remote control generates a classification code 404. A first control code, which is a function of the user input and the class to which the user input belongs, is then accessed 406. The control code is then transmitted 408. Transmission of control codes is typically achieved by way of an IR transmitter, but is not required to be accomplished in this manner. Any suitable means of wireless communication between the universal remote control unit and the target A/V device may be used.

Figure 5:
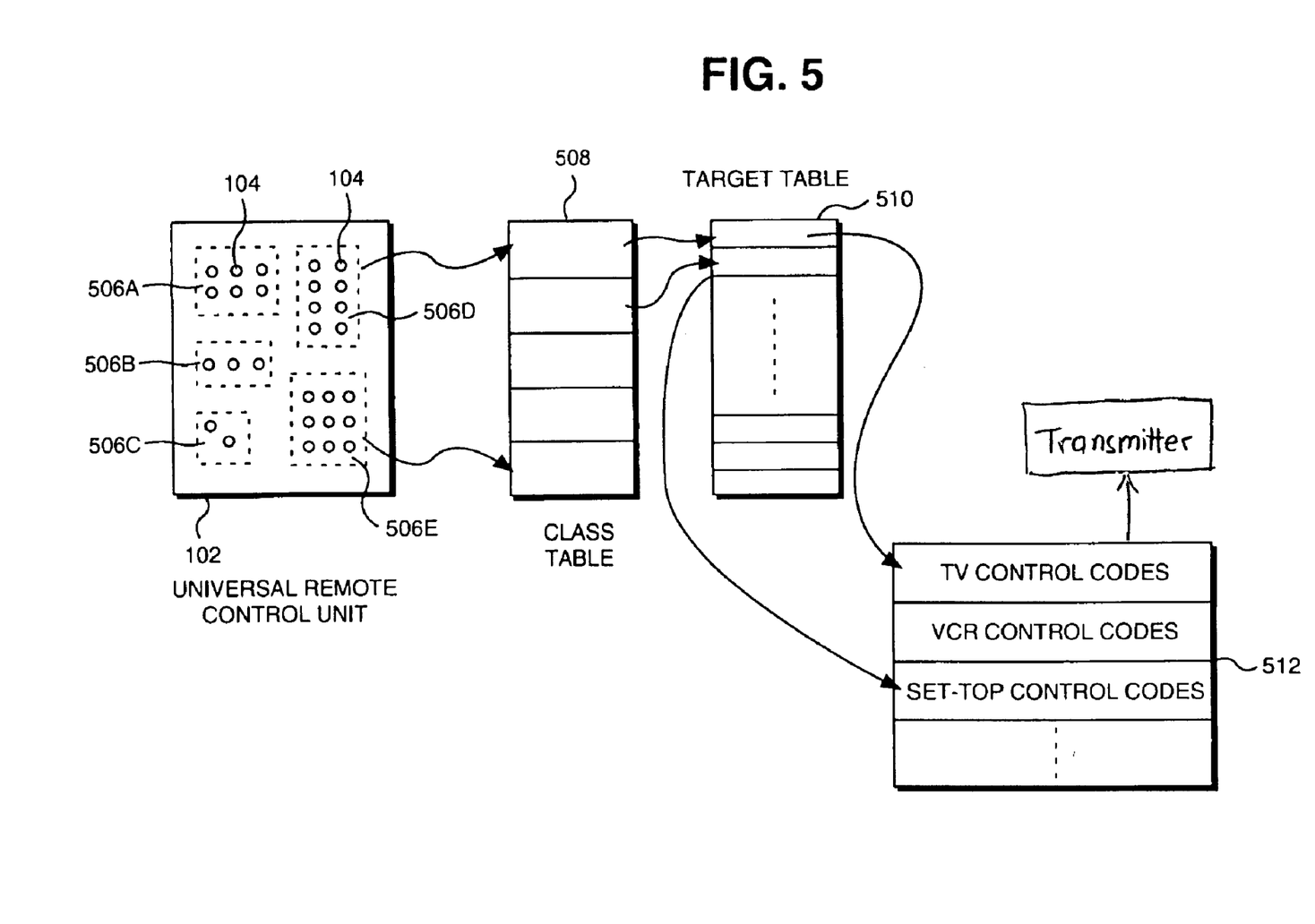
FIG. 5 is a block diagram showing a system architecture including a schematic representation of a set of input buttons on a universal remote control unit, and several tables contained in the memory of such a universal remote control unit that may be used for classifying a user input within a particular function class and generating a classification code, determining which device is associated with the classification code and accessing the control code or codes needed to send the command indicated by a button press to the device which has a programmed association with the function class to which the button belongs.

FIG. 5 is a block diagram showing a system architecture including a schematic representation of a set of input buttons on a universal remote control unit, and several tables contained in the memory of such a universal remote control unit that may be used for classifying a user input within a particular function class and generating a classification code, determining which device is associated with the classification code and accessing the control code or codes needed to send the command indicated by a button press to the device which has a programmed association with the function class to which the button belongs. More particularly, FIG. 5 shows a universal remote control unit 102, having a plurality of buttons 104, and a plurality of groupings 506a, 506b, 506c, 506d and 506e, each of which includes one or more buttons 104., Pressing of the buttons is a typical way for a user to communicate with the universal remote control unit. Groupings 506a, 506b, 506c, 506d and 506e may correspond to function classes such as a Power Class, a Channel Change Class, a Volume Change Class, a Transport Class, and a Control Class respectively. A class table 508 is a memory structure within the universal remote control unit which is used for mapping the button presses to function classes. That is, when a button is pressed, one ore more electrical signals representative of that button press are generated, and as a function of those one or more signals, a classification code is "looked up". The output of class table 508 as a function of the one or more signals (i.e., the classification code) effectively tells the system to which one of the several function classes that the pressed button belongs. The classification code is then used to access a target table 510 which contains the information that defines the default target device for each function class. For example, if the Mute button is pushed, class table 508 maps this button press information to the Volume Change classification code, and the Volume Change classification code is then mapped by target table 510 the information needed to know what default device has been selected for the Volume Change Class of commands. That is, if the TV has been selected for the Volume Change Class of commands rather than the cable box, then the output of target table 510 provides one or more signals which are used to access the appropriate Volume Change control codes for the TV. The ability to change the contents of target table 510 so that other devices may be associated with any particular function class is one aspect of the programmed association feature of the present invention.

In some embodiments of the present invention, the programmed association feature is implemented in software. Various software implementations may also be referred to as firmware. References to software or firmware each refer to having a stored control program executed by associated hardware. When a button on a remote control unit in accordance with present invention is pressed, the signal or signals generated thereby are interpreted as those representing button presses that are intended to transmit a message to the device(s) under control and those representing button presses that are not intended to transmit a message to the device(s) under control. Button presses that are intended to transmit a message are further classified, typically via a table lookup operation, as one of five classes, i.e., buttons that control volume; buttons that control channel selection; buttons that control power; buttons that control transport; and buttons that control other miscellaneous functions. If the programmed association feature is active (and not bypassed) this classification is used as an index into a table with one entry per possible classification. The table contains the starting context or target that the remote control unit should use when buttons of that class are pressed. Contexts, as used herein, are defined to be the type of device that is to receive commands from the remote control unit. Such devices include but are not limited to TVs and cable-boxes.

EXAMPLE OF PROGRAMMED ASSOCIATION OPERATION

Figure 6:
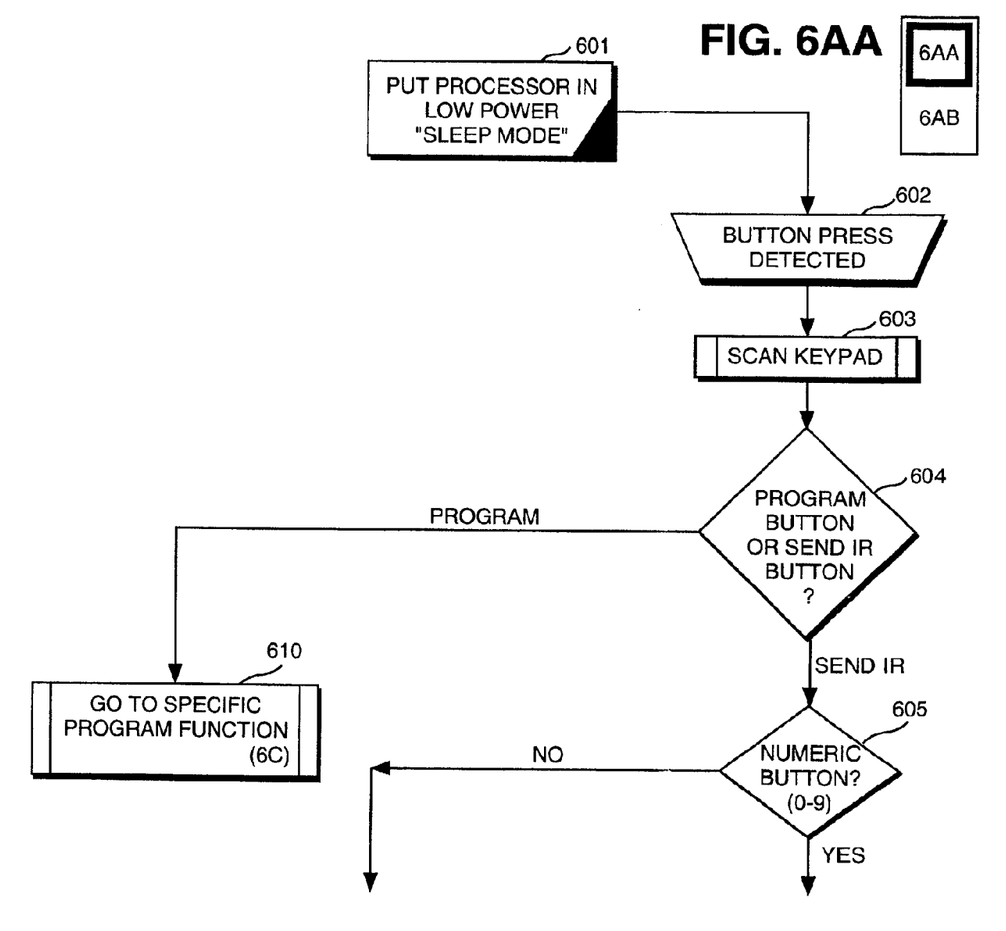

FIGS. 6AA, 6AB, 6B and 6C are flowcharts of a process for setting up, and utilizing the programmed association feature in a specific exemplary embodiment of the present invention. More particularly, and referring to FIG. 6AA, 6AB, this process is described beginning with a processor within the universal remote control unit being put into a low-power sleep mode 601. A button press is then detected 602. A keypad scanning function 603 generates the signals needed to determine what button was pressed. A decision is made 604 as to whether the program button was pressed or a button requiring the transmission of a command was pressed. If a button requiring transmission of a command was pressed, then a decision is made 605 as to whether on the numeric buttons (i.e., 0–9) was pressed. If a numeric button was pressed then a decision is made 606 as to whether the Program Sequence is equal to one of the values 2, 3, or 4. If the Program Sequence is equal to one of the values 2, 3, or 4, then software is executed 607 that increments the Program Sequence, and updates the DeviceID variable such that the new DeviceID value becomes equal to the previous DeviceID value multiplied by ten, plus the decimal value of the numeric key that was pressed. Additional software is executed 608 that displays on an LCD the digit of the numeric key that was pressed, moves the cursor displayed on the LCD, and flashes the LED one time. The processor then returns to the sleep mode 609.

Figure 6B:
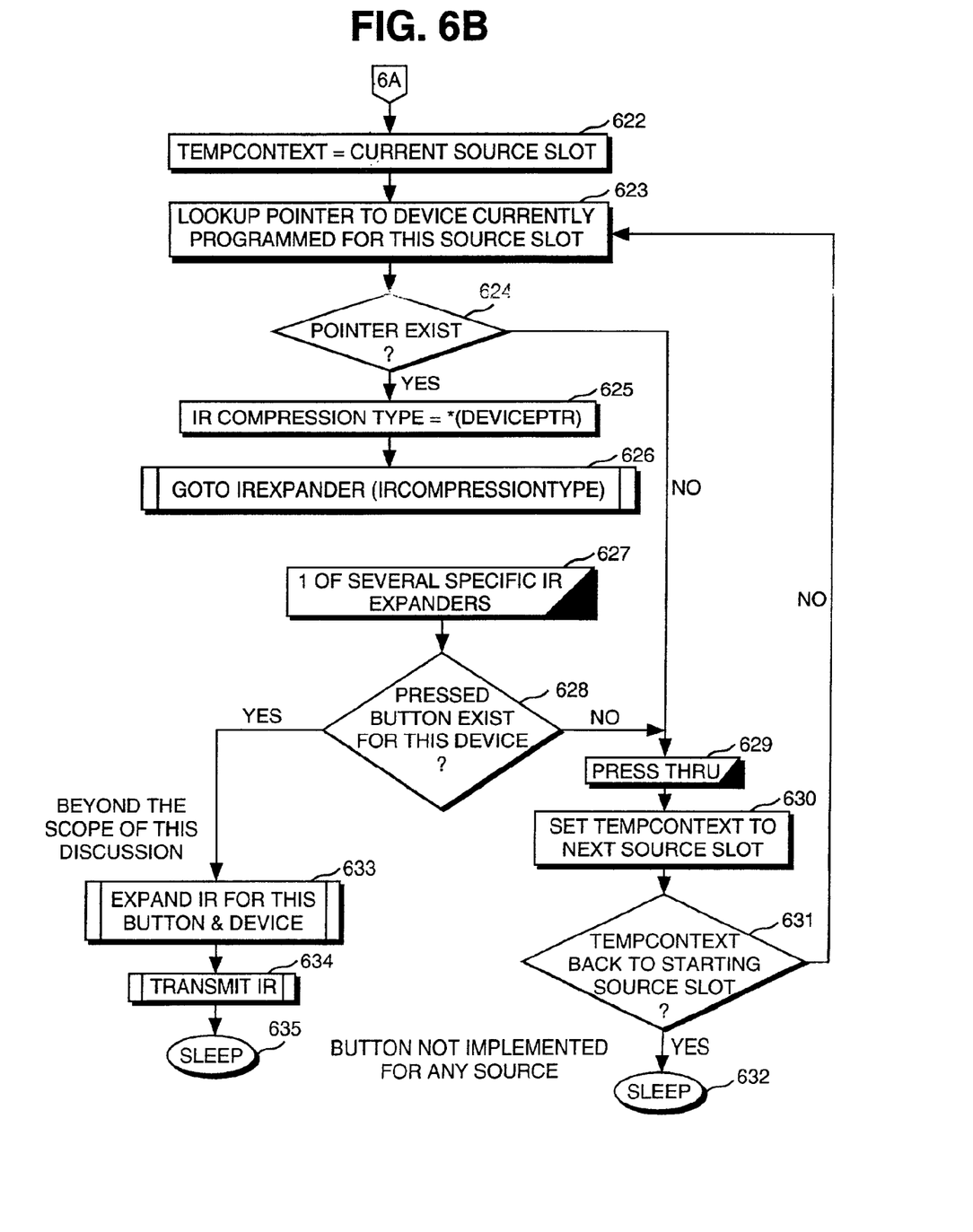
Figure 6C:
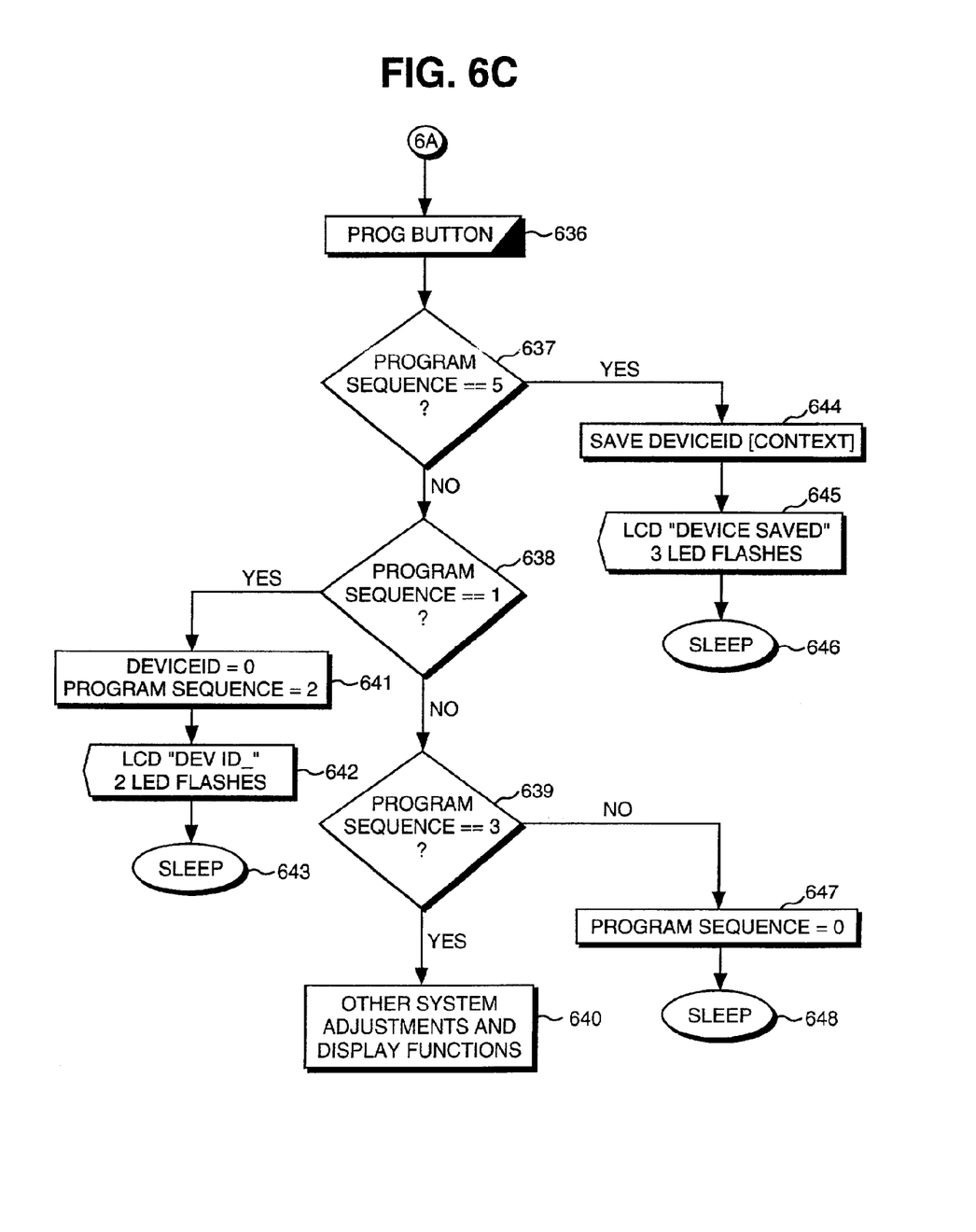

If at decision 604 it is determined that the program button was pressed, then one or more control flow instructions are executed 610 to go to software for the specific program function, as is illustrated more fully in FIG. 6C. Referring now to FIG. 6C, the description begins with the program button having been pressed 636. A decision is then made 637 as to whether the Program Sequence is equal to the value 5. If it is, then the DeviceID variable is saved 644; the text "Device Saved" is displayed on the LCD and the LED is flashed three times 645; and the processor returns to sleep mode 646. If at decision 637 the Program Sequence is not equal to the value 5, then a decision is made 638, as to whether the Program Sequence is equal to the value 1. If it is, then, at 641, the DeviceID variable is set to the value 0, and the Program Sequence is set to the value 2. The LCD displays the text "Dev ID __" and the LED is flashed twice 642. The processor then returns to sleep mode 643. If at decision 638, the Program Sequence was not equal to the value 1, then a decision is made 639 as to whether the Program Sequence is equal to the value 3. If it is, then various system adjustments and display functions may be executed 640. If, at 639, the Program Sequence is not equal to the value 3, then the Program Sequence is set equal to zero 647, and the processor returns to sleep mode 648.

Referring now to FIG. 6AA, 6AB, if at decision 605, it is determined that a numeric button has not been pressed, then a decision is made 611, as to whether the Program Sequence is equal to the value 2. If it is, then software is executed 618 that sets the value of the variable Class to the result of the Classify function that is executed with an argument indicative of which button was pressed. FIG. 2 shows a high level representation of exemplary table that can be used by the Classify function. That is, the information representative of the button that was pressed is compared to the list of buttons in the partitioned list shown in FIG. 2. When a match is found between the specific button that was pressed, and the button codes in the partitioned table, then a value is returned which represents the function class to which the button belongs. As shown at 619 in FIG. 6AA, 6AB, the Program Sequence variable is set to the value zero, the state of the universal remote control unit is set such that the programmed association feature is enabled, and a programmed association array is set so as to associate the selected function class with the current context, i.e., the presently selected A/V device source (a.k.a., the target of the control commands for that function class). Setting the state of the universal remote control unit is typically achieved by setting the binary state of one or more storage bits to a predetermined value. Additional software is executed 620, such that the LED is flashed three times, and text is displayed on the LCD indicating the Priority (i.e., the programmed association) has been set in accordance with the function class to which the pressed button belongs. The processor then returns to sleep mode 621.

If at decision 611, it is determined that the Program Sequence variable is not equal to the value 2, then a decision is made 612 as to whether the programmed association feature is enabled. If it is not enabled then control passes to 622 as shown in FIG. 6B, which is described in detail below. If the programmed association feature is enabled, then software is executed 613 that sets the value of the variable Class to the result of the Classify function that is executed with an argument indicative of which button was pressed. A temporary variable, referred to as temp, is then set equal to the programmed association array 614. A decision is then made 615 as to whether a variable, referred to as 'temp source slot' is set to a value representative of being empty. If it is, then control passes to 622 as shown in FIG. 6B, which is described in detail below. If, at 615, 'temp source slot' is not set to the value representative of being empty, then, at 616, the variable Context is set to the value of the variable temp, and the variable Program Sequence is set to zero. Additional software is then executed 617, such that text is displayed on the LCD indicating which A/V device that the programmed association feature has associated the pressed button. Control then passes to 622 as shown in FIG. 6B, which is described in detail below.

Referring now to FIG. 6B, a variable referred to as 'TempContext' is set equal to the value of the variable referred to 'Current slot source' 622. A pointer to the A/V device currently programmed for this source slot is then looked up 623. A decision is then made 624, as to whether any pointer exists. If a pointer does exist, then a variable referred to as 'IR Compression Type' is set equal to the value of the pointer 625. At 626 control is passed to one of several IR Expander routines as a function of the contents of variable IR Compression Type. Operations 627 through 635, described below, provide a more detailed description of the IR Expander functionality, which is not a requirement of the present invention. IR Expander functionality is useful for reducing the amount of memory storage capacity that is needed for a particular implementation of the built-in library of control codes in a universal remote control unit. If, at 624, it is determined that a pointer does not exist, then at 629 the press-through function is executed, and at 630 the variable TempContext is set to the next source slot. A decision is then made 631 as to whether the value of the variable TempContext is the same as the value for the starting source slot. If it is, then the processor returns to sleep mode 632. If, at 631, it is determined that the variable TempContext is not the same as the value for the starting source slot, then control passes back to operation 623.

Still referring to FIG. 6B, a representative one of several specific IR expander routines is entered at 627. A decision is made 628 as to whether the function associated with the button which was pressed actually exists for the selected device. For example, the rewind and fast forward Transport Class functions do not exist for a TV. If the function does not exist, then control is passed to the operation at 629. If the function does exist, then the control code for the selected device and function, which was stored in the universal remote control unit, is expanded (i.e., decompressed) 633, and then transmitted by an infrared transmitter which is part of the universal remote control unit 634. The processor then returns to sleep mode 635.

Figure 7:
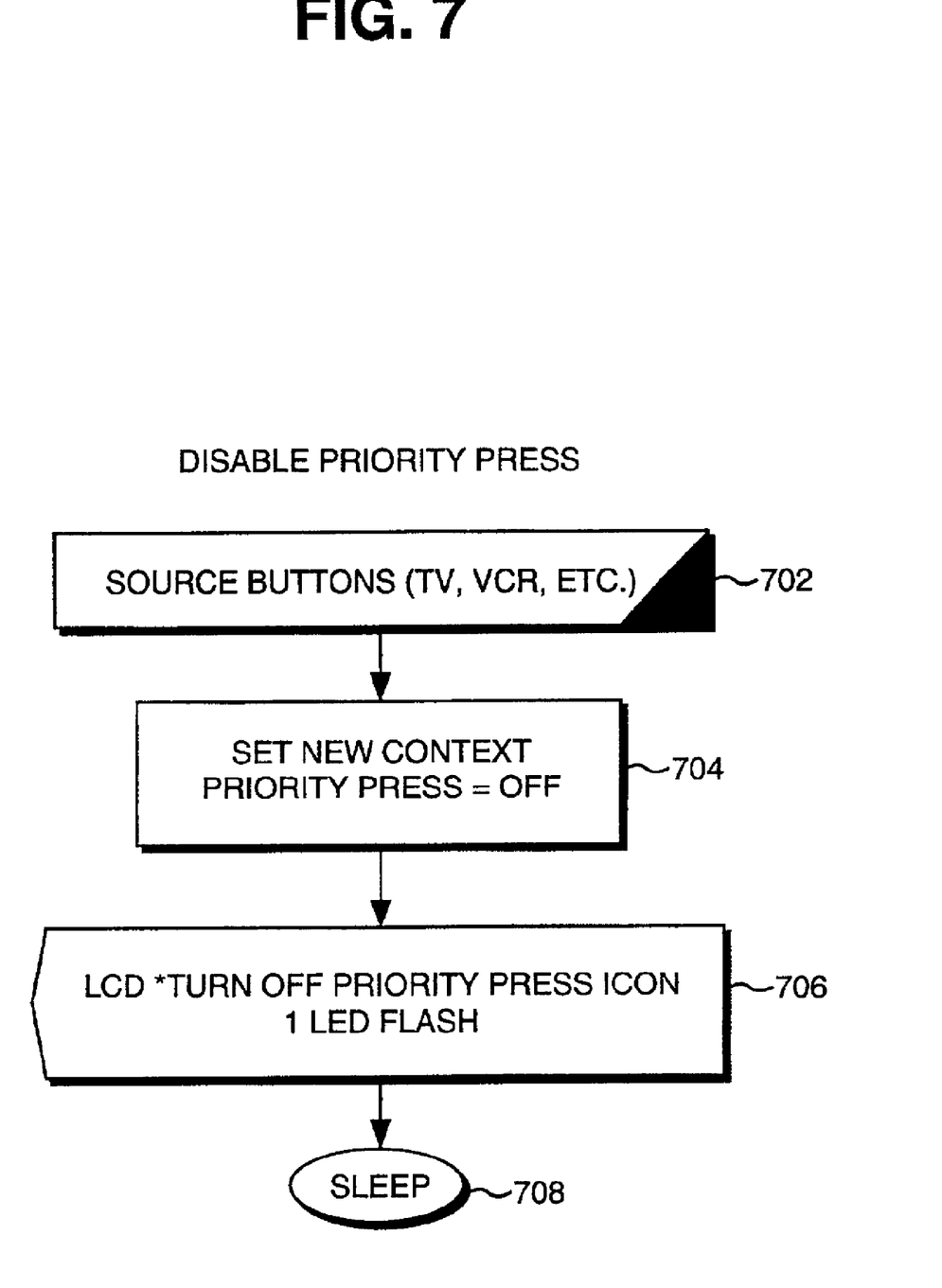
FIG. 7 is a flowchart of a process for disabling the programmed association feature in a specific exemplary embodiment of the present invention.

FIG. 7 is a flowchart of a process for disabling the programmed association feature of a universal remote control unit in a specific exemplary embodiment of the present invention. A source button (e.g., TV, VCR, CBL, AUX) is pressed 702. The state of the universal remote control unit is then changed to reflect that the programmed association feature has been turned off 704. This is typically accomplished by the execution of software which changes one or more bits and thereby sets a new context or state of the universal remote control unit. When this state change takes place, additional software is executed 706 which causes: 1) an LED on the universal remote control unit to flash once; and 2) a Liquid Crystal Display (LCD) on the universal remote control unit to display an icon representative of the off-state of the programmed association feature. The universal remote control unit then enters the sleep state 708.

Figure 8:
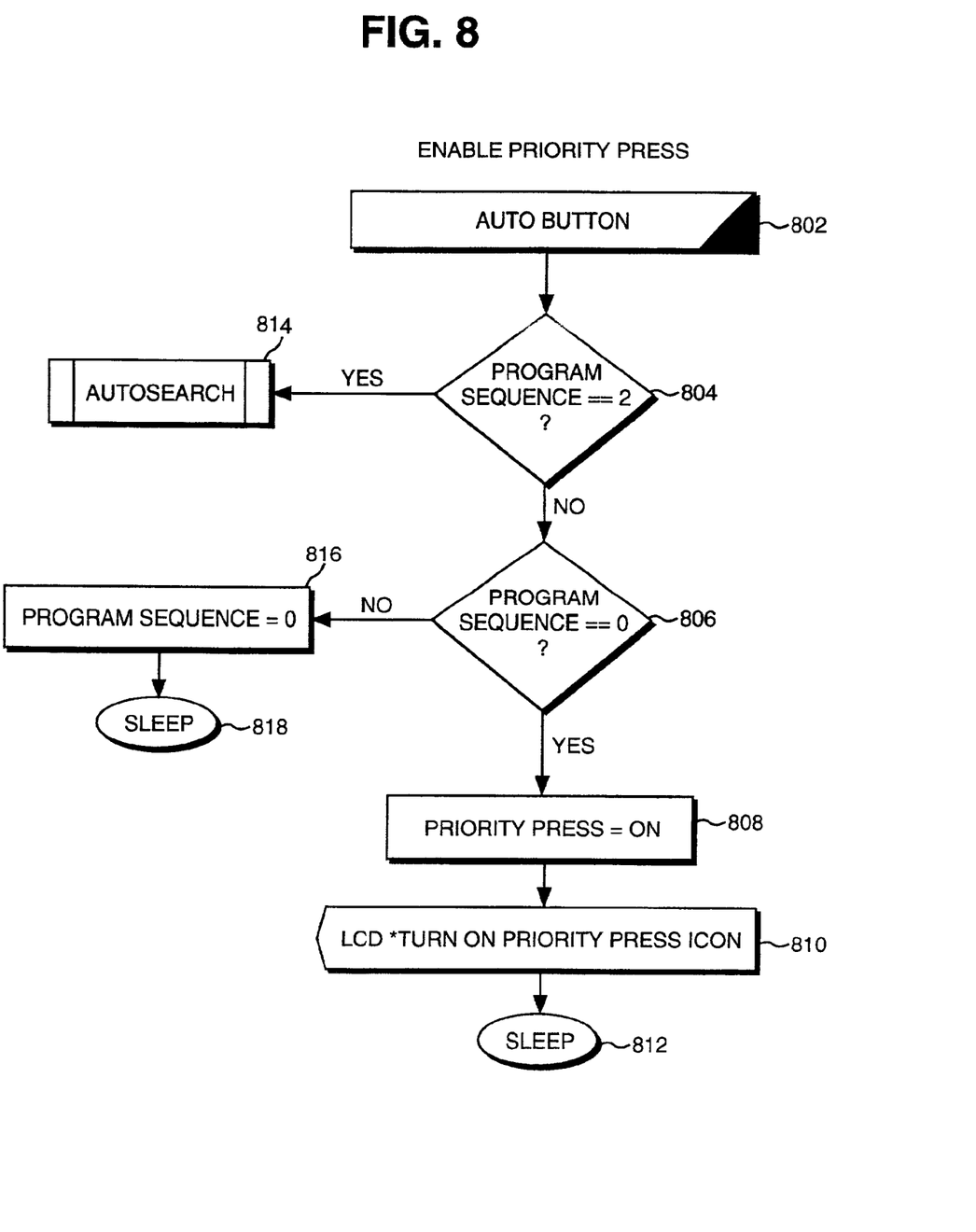
FIG. 8 is a flowchart of a process for enabling the programmed association feature in a specific exemplary embodiment of the present invention.

FIG. 8 is a flowchart of a process for enabling the programmed association feature of a universal remote control unit in a specific exemplary embodiment of the present invention. The AUTO button is pressed 802. It should be noted that use of an 'AUTO' button is not a requirement of the present invention, but rather an illustrative embodiment. In some implementations, that is, embodiments of the present invention, it may be preferable to have a button, or other input mechanism, that is specifically labeled as to its function of reactivating the programmed association feature of the present invention. A determination is then made 804 as to whether the program sequence equals the value 2. If the value is 2 then the Auto-Search function is executed 814. If the value is not 2, then a determination is made 806 as to whether the program sequence equals the value zero. If the value is not zero, then the program sequence is set to the value zero 816 and the universal remote control unit enters the sleep state 818. However, if the value is 0, then the programmed association feature is turned on 808, typically by setting or clearing, one or more storage bits. Additionally, software is executed 810 which causes the LCD to display an icon representative of the programmed association feature being turned on. The universal remote control unit then enters the sleep state 812.

Although most A/V devices share common functionality, they do not necessarily all use the same command codes to activate their various functions. The universal remote control unit of the present invention includes a built-in library of codes for a wide variety of A/V device models from many different manufacturers. The Auto-Search function helps a user to find the correct code for any particular A/V device such as, for example, those found in an entertainment center. When searching for a code using the Auto-Search function the user first selects the appropriate device type. For example, the TV button will cause a search for codes through a built-in library of TV and TV/VCR unit codes; the VCR/DVD button will cause a search for codes through a built-in library of VCR, TV/VCR unit, and DVD player codes. The CBL/SAT button will cause a search for codes through a built-in library of cable box and digital satellite service (DSS) receiver codes. The AUX button will cause a search for codes through the entire built-in library of codes. If a user has difficulty programming device codes or cannot find the correct code in an associated user manual, then the Auto-Search feature can cycle through the available codes automatically to help locate a usable code.

Embodiments of the present invention advantageously provide a solution for the problems of conventional universal remote control units. For example, a user has a television and a cable-box, and wants the cable-box to control the channel selection, but wants the TV to control volume and power. Without the programmed associations of the present invention, a user might pick up the conventional remote control unit and press the power button with the intention of turning on the television. Unfortunately, if the previous operation of the conventional universal remote control unit was directed to the cable-box, then instead of turning on the TV, the cable-box will unintentionally be turned off. To correct this result, a user with the conventional universal remote control unit must press the power button again to turn the cable-box back on, press the TV select button, and press the power button a third time to turn on the TV. The user must then remember to press the CABLE button on the conventional universal remote control unit before the channel selected from the cable-box can be changed or the TV tuner channel will be changed instead. However, with embodiments of the present invention which include the programmed association feature, when the power button is pressed, the remote control unit will know to send the power code for the TV. When the channel button is pressed, the remote control unit will know to send the code(s) for the cable-box. When any volume button is pressed, the remote control unit will know to send the code(s) for the TV. This reduces button presses and errors.

A SPECIFIC EXAMPLE

The programmed association features of the present invention are also collectively identified with the trademark of Priority Press® owned by Innotech Systems of Port Jefferson, N.Y. In this illustrative embodiment of the present invention, the programmed association features are implemented in a universal remote control unit designed for use in controlling a variety of audio/visual consumer electronic devices such as those commonly found in an entertainment center, and as described above in this disclosure. The programmed association features make using this illustrative remote control unit simpler for a user than conventional remote control units by reducing or eliminating the need to push the TV, CABLE, VCR, or AUX button every time the user wants to change which device is to be controlled by wireless commands transmitted by the illustrative remote control unit. With the programmed association feature of the present invention, the user decides which entertainment device is to be used for common functions. After the user then programs the programmed association feature, the common function mentioned immediately above is performed with only one button press.

This illustrative embodiment also includes voice programming, and the present invention acts to simplify voice programming by reducing the number of button presses required to perform a function.

Once the programmed association features have been programmed, a user, might never need to press the selection buttons such as TV, CBL, VCR, or AUX again. In this illustrative embodiment, information regarding the programmed association is stored in a non-volatile memory within the remote control unit, and so even if batteries need to be changed, the TV, CBL, VCR, or AUX buttons, are not required to be used again. However, in this illustrative embodiment, a combination of button presses is used to inform the remote control unit that the user desires to erase the current settings of the programmed association features. In this illustrative embodiment, pre-defined programmed associations between button function classes and content sources (i.e., command targets) are provided in non-volatile memory by the manufacturer. It should be noted that such default settings may also be provided by any suitable means other than non-volatile memory, such as for example, specific logic circuitry included within the inventive universal remote control device.

For example, if both the cable box and TV can control volume, a user may have the illustrative universal remote control unit automatically select the TV whenever the Volume UP, Volume Down, or Mute buttons are pressed, while the cable box is automatically selected when the Channel Up, Channel Down, or any numeric button is pressed. This is in contradistinction to conventional universal remote control units wherein a user must remember to press the TV button to change to the TV mode, then change the volume, then press the CBL button to switch back to the cable mode to continue changing the channels.

To set up the programmed association in this illustrative embodiment of the present invention, a user presses a device button (e.g., TV, CBL, VCR, or AUX), for the device that is to be programmed. A light emitting diode (LED) that is incorporated into the universal remote control unit of this example flashes once to indicate to the user that one of the device buttons has been pressed. Next the PROG button is pressed, and the LED flashes twice in response to let the user know that the programming mode has been entered. After the PROG button has been pressed, any button in the desired group of function class buttons may be pressed. The LED then flashes three times to indicate to the user that the programming operation has been completed. Any button in the function class group that was selected will now control the selected device. For example, to set up the programmed association feature to use the volume commands to control the TV, the TV button, the PROG button, and the Volume Up button are pressed sequentially. In another example, to automatically select the cable box whenever it is desired to change channels, the CBL button, the PROG button, and the Channel Up button are pressed sequentially.

The programmed association feature classifies buttons of each common type (i.e., function class) together. The classifications in this example are: volume-related buttons; channel-related buttons; tape/DVD-related buttons, and power-related buttons. Once a user assigns (i.e., associates) any button to a device, all the buttons of that type are automatically assigned to the same device. For example, if the Channel Up button is assigned to the cable box, then the Channel Down, Previous, and numeric buttons are all assigned to the cable box. Similarly, if the user assigns the Volume Up button to the TV, then the Volume Down, and Mute buttons are also assigned to the TV.

In this example the programmed association feature can be turned off by pressing any source button (e.g., TV, VCR, CBL, AUX). The programmed association feature may be turned back on by pressing the Auto button. This aspect of the present invention is useful in particular if the user wishes to override the programmed association feature to, for example, record one channel with the VCR, while watching a different channel with the TV. In this illustrative embodiment the LED will flash once when the programmed association feature is turned overridden. Pressing the Auto button will reactivate, or reinstate, the previous programmed association.

CONCLUSION

The examples and descriptions above are provided simply to illustrate the present invention. Those skilled in the art and having the benefit of the present disclosure will appreciate that further embodiments may be implemented with various changes within the scope of the present invention.

Embodiments of the present invention provide apparatus and methods for selecting a default device to which control codes are to be transmitted when a button from a particular class of buttons is pressed. Any suitable method of programming the remote control unit so that it knows which audio/visual source to select when a particular class of buttons is activated may be used. Similarly, the present invention contemplates any suitable method and apparatus for deactivating and reactivating the programmed association of a function class and an audio/visual source. Although an apparatus in accordance with the present invention is typically a remote control unit having buttons to accept input from a user, as discussed above, the present invention is independent of the exact nature of the mechanism by which a user provides such input, and therefore keys, switches, touch-screens, voice recognition, and other suitable means of input may be substituted for buttons in embodiments of the present invention. Voice recognition functionality is typically achieved through a combination of hardware and software, although, as will be appreciated by those skilled in the art, a hardware-only voice recognition solution may be used. Whether hardware only, or hardware/software combinations are used to implement voice recognition modules, a microphone is typically included with the voice-enabled remote control unit to convert sound waves to electrical signals.

In alternative embodiments of the present invention, a class of buttons may contain a single button, and by extension, every button may be in its own unique class. These class associations may be fixed or programmable. In other words, buttons (or any specific input mechanism (including voice commands)) are not necessarily divided into classes but are individually programmable as to what entertainment content source (i.e., A/V device) is to be the first, or priority source when a particular button is pressed. While such a scheme may be more tedious for a user, since each button would have to be programmed, as opposed to each class of buttons, however, such a scheme provides greater flexibility and is suitable for covering special cases where buttons sometimes have strange mappings in a universal remote control unit.

An advantage of some embodiments of the present invention is that fewer button presses are required to implement some commands.

An advantage of some embodiments of the present invention is that fewer keystroke errors are encountered by users.

Various modifications and changes may be made to the above-described examples which are within the scope of the present invention. For example, LEDs may be replaced with incandescent light bulbs, audio alerts, or any suitable means for communicating with the user.

Other modifications from the specifically described methods and apparatus will be apparent to those skilled in the art and having the benefit of this disclosure. Accordingly, it is intended that all such modifications and alterations be considered as within the spirit and scope of the invention as defined by the claims.

What is claimed is:

1. A method of transmitting information from a first device to a second device, comprising:

receiving a first user input at the first device, the first user input indicating a first one of a plurality of second devices;

receiving, subsequent to the first user input, a second user input at the first device, the second user input indicating that a programmed association mode has been selected;

receiving, subsequent to the second user input at the first device, a third user input at the first device, the third user input belonging to a first one of a plurality of user input classes;

associating the first one of the plurality of user input classes with the first one of the plurality of second devices;

receiving, subsequent to the third user input at the first device, a fourth user input at the first device, the fourth user input belonging to the first class;

identifying one of a plurality of sets of information which is associated with the first class;

looking up at least one datum in the identified set of information; and transmitting the datum;

wherein the third and fourth user inputs are different from each other.

2. The method of claim 1, wherein the information is control information, and the datum is a control code.

3. The method of claim 1, further comprising determining if a programmed association feature is active.

4. The method of claim 3, wherein receiving the user input comprises recognizing a button press.

5. The method of claim 4, wherein the first device is a remote control unit.

6. The method of claim 1, wherein the second device is selected from the group consisting of televisions, set-top boxes, compact disc players, digital versatile disk players, tuners, radio receivers, and satellite receivers.

7. The method of claim 1, wherein the second device is a remotely controllable entertainment device.

8. The method of claim 7, wherein transmitting comprises generating an infrared signal.

9. The method of claim 1, wherein the information is control information, the datum is a control code; receiving the user input comprises recognizing a button press: the first device is a remote control unit; the second device is a remotely controllable entertainment device; and further comprising determining if a programmed association feature is active.

10. A method, comprising:

receiving a first input, the first user input indicating a first one of a plurality of target devices;

receiving, subsequent to the first input, a second input, the second input indicating that a programmed association mode has been selected;

receiving, subsequent to the second input, a third input, the third input belonging to a first one of a plurality of user input classes;

associating the first one of the plurality of user input classes with the first one of the plurality of target devices;

receiving a user input;

generating a classification code based, at least in part, on the user input;

accessing a first control code based, at least in part, on the user input and the classification code, the first control code stored in a memory; and transmitting the first control code;

wherein the transmission is directed to the first one of the plurality of target devices.

11. The method of claim 10, wherein generating the classification code comprises a table-look-up operation.

12. The method of claim 10, wherein accessing the first control code comprises generating a memory address and reading out the contents of a memory location.

13. The method of claim 12, further comprising accessing a second control code based, at least in part, on the user input and the classification code.

14. The method of claim 10, wherein transmitting the first control code comprises converting the control code to infrared signals.

15. The method of claim 10, wherein receiving the user input comprises detecting a button press and generating one or more electrical signals.

16. The method of claim 10, wherein receiving the user input comprises detecting a button press and generating one or more electrical signals representative of the button press; generating the classification code comprises a table-look-up operation; accessing the first control code comprises generating a memory address and reading out the contents of a memory location; and transmitting the first control code comprises converting the control code to infra-red signals.

17. The method of claim 10, wherein accessing the first control code comprises accessing data from a table based at least in part on the classification code, and wherein data in the table represents a programmed association between a classification code and a target device.

18. An article of manufacture, comprising a machine readable medium upon which is included instructions which when processed by the machine will cause the machine to receive a first user input, the first user input indicating a first one of a plurality of target devices; receive, a second user input, the second user input indicating that a programmed association mode has been selected; receive, a third user input, the third user input belonging to a first one of a plurality of user input classes; associate the first one of the plurality of user input classes with the first one of the plurality of target devices; receive a fourth user input the fourth user input belonging to the first class; identify one of a plurality of sets of information which is associated with the class; look up at least one datum in the identified set of information; and transmit the datum to the first one of the plurality of target devices.

19. The article of claim 18, further including instructions which when processed by the machine will cause the machine to determine if a programmed association feature is active.

20. The article of claim 19, wherein the information is control information, and the datum is a control code.

21. The article of claim 18, wherein transmitting the datum comprises generating an infrared signal.

22. The article of claim 18, wherein receiving the user input comprises recognizing a voice command.

* * * * *